Patented Oct. 19, 1954

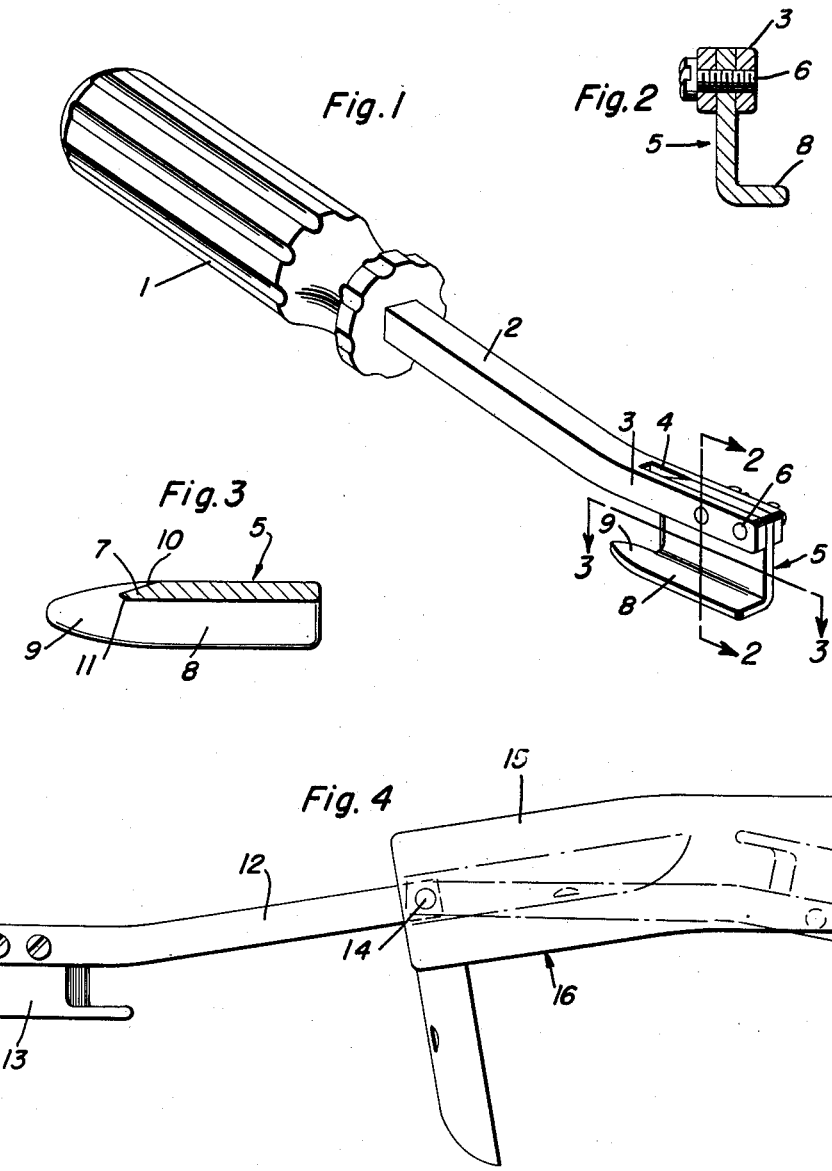

2,691,822

UNITED STATES PATENT OFFICE 2,691,822

CABLE STRIPPING TOOL

Charles Swoope Vaughan, Jr., Tuscumbia, Ala.

Application May 10, 1951, Serial No. 225,510

1 Claim. (Cl. 30—91)

My invention relates to improvements in cable stripping tools of the type forming the subject matter of my U. S. Letters Patent No. 2,398,979 dated April 23, 1946.

An important object of the instant invention is to provide such a tool with a cutting blade formed with a longitudinal bottom edge runner for insertion between the sheath and the cable to guide the blade in the stripping operation, the blade and shoe being stamped out of a single piece of metal, preferably steel, to lower the cost of manufacture of the tool.

Another object is to provide such a tool with a cutting blade having a smoother acting cutting edge and to otherwise adapt the tool, especially the cutting edge of the blade, for cutting through braided glass or metal sheathing of such cables.

Other objects and advantages, together with the precise nature of my improvement will become readily apparent when the succeeding description and claim are read with reference to the drawing accompanying and forming a part of this specification.

In said drawings:

Figure 1 is a view in perspective of my improved cable stripping tool, in the preferred embodiment thereof;

Figure 2 is a view in transverse vertical section taken on the line 2—2 of Figure 1 and drawn to a larger scale;

Figure 3 is a view in longitudinal section taken on the line 3—3 of Figure 1 and drawn to a larger scale;

Figure 4 is a view in side elevation of a modified embodiment of my invention; and, Figure 5 is a view in vertical transverse section of another modified embodiment of my invention.

Reference being had to the drawing by numerals, and first to Figures 1 to 3 thereof, my improved cable stripping tool, in the preferred embodiment thereof, comprises a handle 1, of any suitable material, a rigid shank 2 extending from one end of the handle 1 and terminating in an end portion 3 oblique to the remainder of the shank 2 and bifurcated to form a longitudinal slot 4 therein for receiving a cutting blade 5 secured in the slot 4 by screws 6 for removal and replacement at will.

The cutting blade 5 is rectangular with an inner, or rear, cutting edge 7 transverse to the shank 2 and facing the handle 1 for slitting the sheath of a cable, not shown, when the blade is drawn along the sheath, said blade having a lateral flange forming a bottom edge, longitudinal runner shoe 8 on the blade for insertion under the sheath of the cable to guide the cutting blade 5 along the cable during the stripping operation. The foregoing parts are, with the exceptions presently noted, like the parts of my aforesaid patent.

Coming now to my improvements, the cutting blade 5 has its top edge fitted in the slot 4 flush with the portion 3 to obviate projecting parts on one side of the shank 2, thereby adapting the tool for more convenient and safe carrying in a pocket, the shoe 8 extends from one side of the cutting blade 5, only, with a rounded tapered leading end 9 projecting forwardly of the cutting edge 7 at one side thereof, and the cutting edge 7 is formed by a wide outside, longitudinal bevel 10 and a relatively narrower longitudinal inside bevel 11. Also, the cutting edge 7 is tampered to harden the same, whereas the shoe 8 is tempered so as to be slightly flexible.

By having the shoe 8 at one side only of the cutting blade 5, and slightly flexible, the cutting blade 5 together with the shoe 8 may not only be stamped out from a single piece of steel but said blade may be flexed on the shoe 8 laterally, when stripping, to facilitate cutting in a straight line through the sheath, without breaking the shoe 8 or causing said shoe to bind against said sheet in the stripping operation. By providing the cutting edge 7 with the wide outside bevel 10 and the narrower inside bevel 11, the cutting edge 7 is rendered strong and offset inwardly of the shoe 8 so that the slit in the sheath will be parted by the leading end 9 of said shoe 8 without the shoe 8 projecting from both sides of the cutting blade 5. A further advantage of the described cutting edge 7 is that it may be more easily sharpened to a straight edge than if both bevels were the same.

As shown in the modified embodiment illustrated in Figure 5, the runner shoe 12 may be transversely curved to fit the cable, not shown.

As illustrated in Figure 4, the shank 12 carrying the cutter blade 13 may be suitably attached, as at 14, to the handle 15 of a knife 16 for folding into said handle, in the usual manner, as shown by broken lines in Figure 4.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described the invention, what is claimed as new is:

A cable stripping tool comprising a shank, a cutting blade secured to the shank at one side thereof and having a cutting edge at a right angle to said shank, a bottom edge runner shoe extending laterally from one side only of the cutting blade with a tapered leading end in front of said cutting edge, said shoe being adapted to travel under a cable sheath to guide the cutting edge for splitting said sheath, said shoe being tempered for flexibility so that the cutting blade may be tilted laterally thereon to facilitate guiding said edge, said cutting edge being longitudinally beveled with a narrow bevel on the side of the blade from which the shoe extends and a wider bevel on the opposite side of the blade to offset said cutting edge inwardly over said shoe.

References Cited in the file of this patent

UNITED STATES PATENTS

| Number | Name | Date |
| --- | --- | --- |
| 21,319 | Butler | Aug. 31, 1858 |
| 256,700 | Jincks | Apr. 18, 1882 |
| 328,019 | Fowler | Oct. 13, 1885 |
| 946,190 | Ziegler | Jan. 11, 1910 |
| 1,011,938 | Gaisman | Dec. 19, 1911 |
| 1,259,553 | Perkins | Mar. 19, 1918 |
| 1,301,297 | Newman | Apr. 22, 1919 |
| 2,233,497 | Teigen | Mar. 4, 1941 |
| 2,398,979 | Vaughan | Apr. 23, 1946 |

FOREIGN PATENTS

| Number | Country | Date |
| --- | --- | --- |
| 580,082 | France | Oct. 29, 1924 |